(12) United States Patent
Davis et al.

(10) Patent No.: US 11,961,293 B2
(45) Date of Patent: Apr. 16, 2024

(54) AUTOMATIC HANDBAG RECOGNITION USING VIEW-DEPENDENT CNNs

(71) Applicant: FASHIONPHILE Group, LLC, Carlsbad, CA (US)

(72) Inventors: Sarah Davis, Carlsbad, CA (US); Ben Hemminger, Carlsbad, CA (US)

(73) Assignee: FASHIONPHILE Group, LLC, Carlsbad, CA (US)

( * ) Notice: Subject to any disclaimer, the term of this patent is extended or adjusted under 35 U.S.C. 154(b) by 41 days.

(21) Appl. No.: 17/630,317

(22) PCT Filed: Nov. 5, 2020

(86) PCT No.: PCT/US2020/059119
§ 371 (c)(1),
(2) Date: Jan. 26, 2022

(87) PCT Pub. No.: WO2021/092180
PCT Pub. Date: May 14, 2021

(65) Prior Publication Data
US 2022/0270350 A1 Aug. 25, 2022

Related U.S. Application Data

(60) Provisional application No. 62/931,464, filed on Nov. 6, 2019.

(51) Int. Cl.
G06V 20/20 (2022.01)
G06V 10/764 (2022.01)
G06V 10/774 (2022.01)
G06V 20/60 (2022.01)

(52) U.S. Cl.
CPC ............ *G06V 20/20* (2022.01); *G06V 10/764* (2022.01); *G06V 10/774* (2022.01); *G06V 20/60* (2022.01)

(58) Field of Classification Search
CPC .................... G06V 10/24–248; G06T 7/70–75
See application file for complete search history.

(56) References Cited

U.S. PATENT DOCUMENTS

| 7,050,607 B2 | 5/2006 | Li et al. | |
| 2012/0140994 A1* | 6/2012 | Yamada | G06V 40/161 382/118 |
| 2014/0279613 A1* | 9/2014 | Lee | G06Q 30/0185 705/318 |

FOREIGN PATENT DOCUMENTS

| WO | 2007038680 | 4/2007 | |
| WO | 2013037684 | 3/2013 | |
| WO | WO-2013037684 A1 * | 3/2013 | ......... H04N 1/40012 |

* cited by examiner

*Primary Examiner* — Vincent Rudolph
*Assistant Examiner* — Raphael Schwartz
(74) *Attorney, Agent, or Firm* — CP Law Group PC; Cy Bates (57) ABSTRACT

A system and related methods for identifying characteristics of handbags is described. One method includes receiving one or more images of a handbag, eliminating all but select images from the one or more images of the handbag to obtain a grouping of one or more select images, the select images being those embodying a complete periphery and frontal view of the handbag. For each of the one or more select images, aligning feature-corresponding pixels with an image axis, comparing at least a portion of the one or more select images with a plurality of stored images, and determining characteristics of the handbag based on said comparing.

12 Claims, 8 Drawing Sheets

310 — Receiving one or more images of a handbag

320 — Eliminating all but select images from the one or more images

330 — Aligning feature-corresponding pixels with an axis image

340 — Comparing select images with a plurality of stored images

350 — Determining characteristics of the handbag

AUTOMATIC HANDBAG RECOGNITION USING VIEW-DEPENDENT CNNs

TECHNICAL FIELD

This invention relates to the image analysis of handbags by classification with machine learning models.

BACKGROUND ART

The luxury resale market is growing due to changing consumer preferences such as an emphasis on sustainability and variety. The buying and selling of pre-owned luxury goods have provided many benefits including increased buying power to consumers. In addition, the demand for first-hand sales may also benefit from the luxury resale market because consumers, knowing the resale value of the good, will embed that value at the level of the first-hand purchase. Luxury goods related to fashion can include items such as watches, jewelry, shoes, and handbags.

Handbag manufacturers design their products following specific and generally agreed upon design patterns. These design patterns define a set of product segments where each product segment targets a specific category of consumer interest. For example, a tote bag is a specific category or product segment generally consisting of a medium to large sized handbag with an open top along with two straps. In contrast, a baguette is a small and narrow rectangular purse that is sized similar to a loaf of bread. Furthermore, bag manufacturers tend to expand their product lines by adding subtle variations in each type of product.

A critical aspect of the luxury resale market is the process of providing quotes to consumers interested in selling their secondhand goods. Characteristics such as, inter alia, brand, style, and condition, are factors in determining a quote. As the luxury resale market grows, there will be an even greater need to provide quotes in an efficient manner. One of the steps that would increase efficiency is an automatic identification of a handbag's characteristics.

SUMMARY OF INVENTION

Technical Problem

A process of generating and issuing a secondhand handbag quote typically involves human skill, especially when the secondhand handbag is unique. When a person is involved, many disadvantages may arise, such as generating inaccurate quotes based on a brand and/or style error. In addition, the process can be time consuming and may require a person with years of experience to accurately make the identification.

Handbags have particular technical problems relating to inter-class and intra-class variance, where a class is defined by a particular brand and style but without respect to color. Many aspects of a handbag can be similar among bags having a different brand or style, resulting in a low variance among inter-classes. This is especially challenging given the total number of classes of brand and style combinations that exist. Furthermore, handbags of a same brand and style can have vastly different colors, which produces a high intra-class variance. Color variations of the same handbag brand and style may confuse classification models, thus reducing accuracy.

Solution to Problem

The advancements of machine learning technology, and especially in the field of computer vision, have allowed computers, smartphones, and other devices to automatically perform actions that previously were only capable of being performed by a human actor. One such process that can utilize computer vision for automatic classification is related to the identification of handbag characteristics.

The invention is directed to a method, and related systems, for identifying characteristics of a handbag. The method comprises a series of steps configured to be performed by a computerized system, which series of steps includes: receiving one or more images of a handbag, eliminating all but select images from the one or more images of the handbag to obtain a grouping of one or more select images, the select images being those embodying a complete periphery and frontal view of the handbag, for each of the one or more select images, aligning feature-corresponding pixels with an image axis, comparing at least a portion of the one or more select images with a plurality of stored images, and determining said characteristics of the handbag based on said comparing. Optionally, the method may further comprise transforming the one or more images of the handbag or the one or more select images from a colorscale to a grayscale image. Other features and benefits will be recognized by one having skill in the art upon a review of the instant disclosure. By automating the process of handbag identification, human errors can be eliminated and human activity in the process can be significantly reduced, thereby enhancing the process and reducing costs. Moreover, the automated identification of handbags provides a basis for building other downstream processes, such as pricing and authentication, which can be used in connection with online transactions involving the purchase and sale of handbags.

Advantageous Effects of Invention

The ability to automatically identify characteristics of a handbag, including brand and style, would result in faster and more accurate price quotes. The method and system described herein may be used in conjunction with an automatic pricing tool, which would streamline the entire quotation process to provide sellers immediate quotes. Moreover, the method and system can be integrated with an authentication protocol.

A person with years of experience identifying handbags would no longer be required to identify the handbag product, and the training of new employees, if those employees are needed at all, would be greatly reduced. All of this would reduce time and costs involved in the identification of handbag products being offered for purchase or sale.

A focus on the frontal view and alignment of the handbag reduces complexity of the classification task and thereby increases accuracy. It would further reduce the need to manually annotate parts of an image, which is a time-consuming process common in fine-grained recognition.

Using only the frontal view of a handbag can also provide benefits such as focusing the model classifier on images that show distinct features. These features may include brand markings, design patterns, and size and shape of the handbag, among others that would be recognized by one having skill in the art. The top, sides, bottom, and rear of a handbag do not provide nearly as much detail about such features, and therefore can be excluded from the image analysis protocol.

Transforming images to grayscale prior to identification reduces the likelihood of confusion in the model. Additionally, it also increases the training data per class while reducing the total number of classes.

Other advantageous effects would be appreciated by one having skill in the art upon a review of the accompanying disclosure.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims.

DETAILED DESCRIPTION

For purposes of explanation and not limitation, details and descriptions of certain preferred embodiments are hereinafter provided such that one having ordinary skill in the art may be enabled to make and use the invention. These details and descriptions are representative only of certain preferred embodiments, however, and a myriad of other embodiments which will not be expressly described will be readily understood by one having skill in the art upon a thorough review of the instant disclosure. Accordingly, any reviewer of the instant disclosure should interpret the scope of the invention only by the claims, as such scope is not intended to be limited by the embodiments described and illustrated herein.

For purposes herein, "frontal view" means a view of a prominent side of a handbag which is commonly displayed outwardly while a person is wearing the handbag, and generally includes identifying features such as branding elements, plaques, and the like, as well as zippers, pockets, seams, and other functional elements;

"Complete periphery" means an entire outer perimeter of a handbag, including bottom, sides and top;

"Favorable view" means a view comprising a frontal view and a complete periphery; and "Select images" means images representing a favorable view;

"Feature-corresponding pixels" means pixels associated with features of a handbag, for example and not limitation, features such as branding elements and functional elements, the feature-corresponding pixels being contained or represented within an image. Specific examples can include pixels representing a bottom, top, or side portion of the handbag, among others;

"Image axis" means any of the four sides of an image which comprises bottom, top, life and right thereof;

"Colorscale" means having any color from a color spectrum;

"Grayscale" means having only different shades of gray;

"Stored images" means images of handbags stored on a network drive;

"Style-identifying features" means features useful to identify a brand and/or style of a handbag;

"Stored-image features" means features of known handbags of the stored images that are useful to represent a brand and/or style of a particular handbag;

"Favorable view classifier" means a classifier trained to identify an image having a handbag with a favorable view; and "Base" means a bottom portion of a handbag.

While this disclosure is illustrative of a method and system for identifying handbags, which can be integrated with processes for authenticating, pricing and completing a transaction for the purchase and/or sale of a handbag product, the method and system can be similarly adapted to other fashion items, such as shoes, jewelry, clothing, and the like, such that select images are isolated from a population of images of a product class, colored images are converted to greyscale, and identification is similarly performed against a known data set of images.

Now turning to the embodiments, in a first aspect, a method for identifying characteristics of a handbag is disclosed. The method comprises in any order: receiving one or more images of a handbag, eliminating all but select images from the one or more images of the handbag to obtain a grouping of one or more select images, the select images being those embodying a complete periphery and frontal view of the handbag, for each of the one or more select images, aligning feature-corresponding pixels with an image axis, comparing at least a portion of the one or more select images with a plurality of stored images, and determining said characteristics of the handbag based on said comparing.

In some embodiments, the characteristics that are determined comprise a brand identifier and a style identifier. Examples of a brand identifier may include, inter alia, Louis Vuitton, Chanel, Gucci, and Prada. Examples of a style identifier may include, inter alia, Monogram Keepall 50, Monogram Batignolles Horizontal, and Evercalf Kelly Retourne 32 Havane.

In the first aspect of the invention, the steps of the method may further comprise transforming the one or more images of the handbag or the one or more select images from a colorscale to a grayscale image.

In some embodiments, said comparing the at least a portion of the one or more select images with a plurality of stored images comprises: for each of the one or more select images, extracting a plurality of style-identifying features from the handbag contained therein, and comparing the plurality of style-identifying features with a plurality of stored-image features from each of the plurality of stored images.

In some embodiments, the eliminating all but select images from the one or more images of the handbag comprises: executing a frontal view classifier and identifying each of the one or more images that are select from the frontal view classifier. The frontal view classifier is trained by collecting a first dataset that comprises a plurality of images where each of the plurality of images comprises one of a plurality of handbags. The plurality of images that embody a complete periphery and frontal view are labeled as select. A first model is then trained with the first dataset. Any incorrect predictions made by the first model are collected into a second dataset. A second model is then trained with the first and second datasets.

In a second aspect, a computer system is disclosed. The computer system comprises a processor and a non-transitory computer-readable medium. The non-transitory computer-readable medium is configured to store instructions. The instructions, when executed by the processor cause the processor to perform steps that comprises: receiving one or more images of a handbag, eliminating all but select images from the one or more images of the handbag to obtain a grouping of one or more select images, the select images being those embodying a complete periphery and frontal view of the handbag, for each of the one or more select images, aligning feature-corresponding pixels with an image axis, comparing at least a portion of the one or more select images with a plurality of stored images, determining characteristics of the handbag based on said comparing.

The processor can be any suitable processing device such as a processor core, a microprocessor, and ASIC, a FPGA, a controller, a microcontroller, and the like. The processor can be one processor or a plurality of processors that are operatively connected. The non-transitory computer-readable medium can include memory such as RAM, ROM, EEPROM, EPROM, flash memory devices, magnetic disks, and combinations thereof.

In a third aspect, a non-transitory computer-readable medium is disclosed. The non-transitory computer-readable medium is configured to store instructions. The instructions, when executed by one or more computers, cause the one or more computers to perform operations comprising: receiving one or more images of a handbag, eliminating all but select images from the one or more images of the handbag to obtain a grouping of one or more select images, the select images being those embodying a complete periphery and frontal view of the handbag, for each of the one or more select images, aligning feature-corresponding pixels with an image axis, comparing at least a portion of the one or more select images with a plurality of stored images, and determining characteristics of the handbag based on said comparing.

In a fourth aspect, a method of preprocessing data for an image classification model for identifying handbags is disclosed. The method comprises: collecting images of handbags, deleting images other than those embodying a frontal view of one of the handbags to create a grouping of select images, associating each of the select images with a brand identifier and a style identifier, stratifying each of the select images into one of a plurality of groups, each of the groups being distinguished by a combination of brand and style, and storing each of the select images as stored images.

In the fourth aspect, the method may further comprise aligning a base of each of the individual handbags in each corresponding image to a bottom portion of the corresponding image such that the base and the bottom portion are characterized as having a parallel formation.

In the fourth aspect, the method may further comprise transforming each of the images or select images from a colorscale to a grayscale image.

In the fourth aspect, the method may further comprise, for each group of the plurality of groups, eliminating the group if a total number of images in the group are less than a threshold amount. If a combination of a brand and a style do not have a sufficient number of images for training, it could have a negative effect not only on the identification of that particular brand and style, but also on other brand and style combinations. Setting a threshold amount can mitigate the negative effect. Determination of the threshold amount may be done empirically or by industry standards. Analyzing results such as accuracy, precision, recall, training loss, and/or validation loss may be needed to fine tune the threshold amount.

Figure 1:
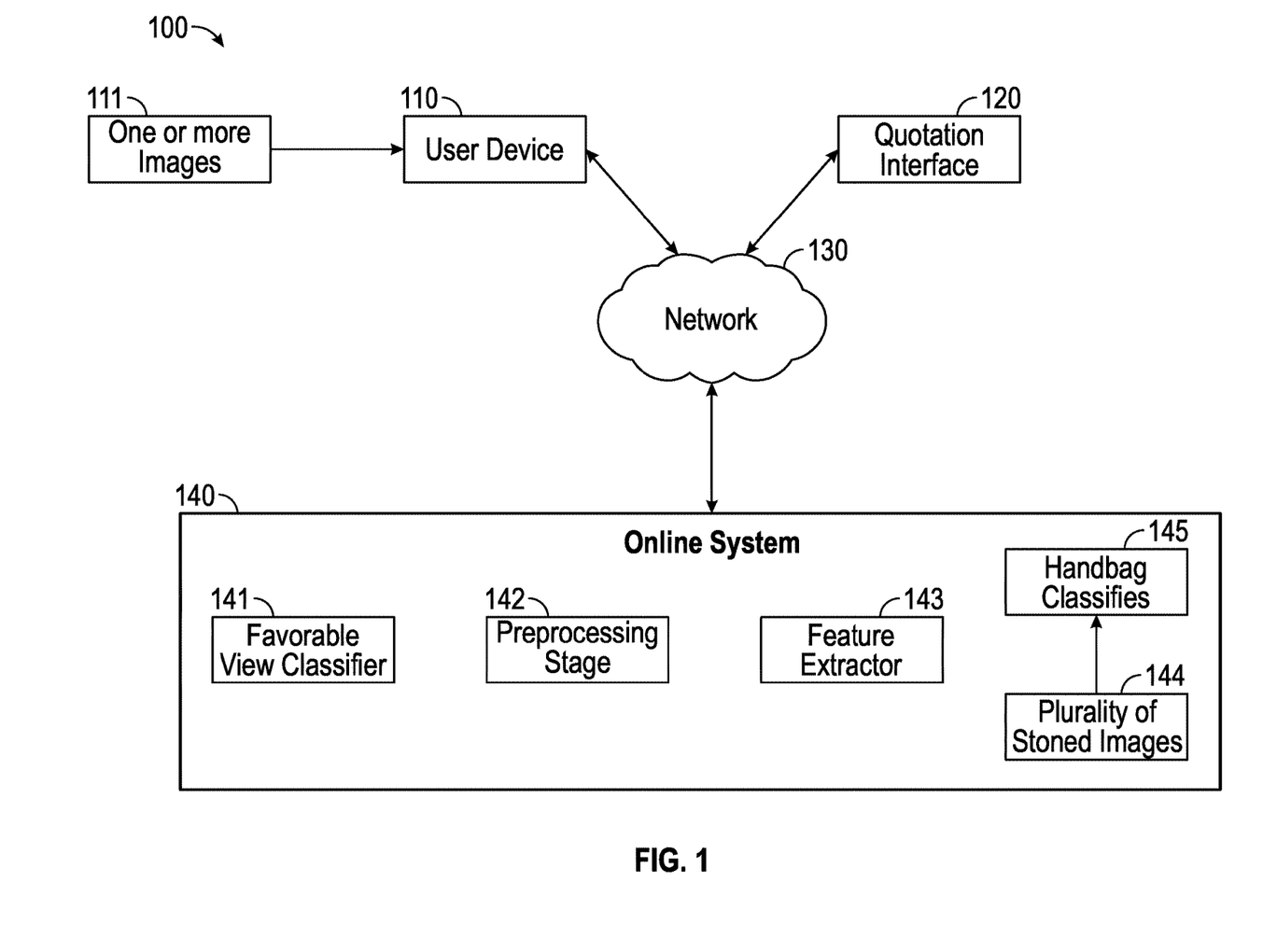
FIG. 1 is a system block diagram representation of an embodiment of a handbag classification system.

Referring to FIG. 1, a system block diagram (100) is shown. The system comprises a user device (110), a quotation interface (120), and an online system (140), which are each coupled by a network (130). The user device is configured to acquire and upload one or more images of a handbag (111) to the online system via the network. The one or more images are processed through a series of modules within the online system for the purpose of identifying characteristics of the handbag. The online system comprises modules including a favorable view classifier (141), a pre-processing stage (142), a feature extractor (143), a plurality of stored images (144), and a handbag classifier (145). After the one or more images has been processed through the online system, a prediction is made regarding characteristics of the handbag. Generally, the characteristics of brand and style are preferred for purposes of creating an accurate quotation. The prediction is sent to the quotation interface via the network, where based on the characteristics, a price quote can be created and sent to the user device via the network. The quote may be derived from a person with knowledge and experience in handbags, or alternatively, the quote may based on historical information regarding handbags having a similar brand and style. Use of this historical information may be processed manually by an individual or done automatically by an algorithm or machine learning model.

The quotation interface (120) can be on any device including the user device (110) or a device operated by third party. Generally, the user device is operated by a customer requesting a quote, whereas and the quotation interface (120) is operated by an individual issuing the quote. However, in an alternative embodiment, the user device and quotation interface may both be operated by the individual issuing the quote. For example, a handbag may be physically brought to an individual to receive a quote. The individual would acquire the one or more images of the handbag (111), send said one or more images via the network (130) to the online system (140), and receive back a predicted brand and predicted style displayed on the quotation interface. The individual is then capable of generating a quote based on the predicted brand and style. For clarity, the user device, or client device, can comprise a smart phone, tablet, or similar portable electronic device, and may reside on the client side, where the client side is distinct from the network side and may be operated by an enterprise or individual actor.

Alternatively, another embodiment may have the user device and quotation interface both be operated by the customer. For example, if the means of generating a price for the quote are done automatically by an algorithm or machine learning model, then the customer would operate both the user device (110) and quotation interface (120). After the one or more images (111) of a handbag are sent to the online system (140), the predicted brand and predicted style are used by a specially designed algorithm or machine learning model to generate a quote for the handbag. The quote would subsequently be sent to the user device for display, the user device comprising the quotation interface.

Notwithstanding anything else in the disclosures, the user device (110) can be a computing device such as a desktop computer, a laptop computer, a portable computer, a smartphone, a tablet, or any other device having computing functionality and data communication capabilities. The user device may have a camera communicatively coupled therewith. The camera may create the one or more images of the handbag (111) that is sent to the online system (140).

The one or more images of a handbag (111) may be sent through an application downloaded by the user device (110). Alternatively, the one or more images may be uploaded to a website operated by the individual issuing the quote. Another means of transferring the one or more images may be accomplished via text message, whereby the one or more images are included in an SMS text message and sent to a phone number dedicated to receiving images. The one or more images are routed to the online system (140). A quote can be generated from the prediction and returned via a secondary text message.

Instructions may be given on the user device (110) regarding the kinds of images that are desirable. More particularly, a request for an image having a frontal view and complete periphery of the handbag may be provided. If none of the one or more images (111) sent from the user device have favorable view, which comprises a frontal view and complete periphery, an operator of the user device may be notified and given the opportunity to send additional images.

Along with receiving the predicted brand and style, an operator of the quotation interface (120) may also need to determine color of the handbag prior to issuing a quote. A process of determining one or more colors can be done manually or automatically. If the process is done manually, the operator of the quotation interface may refer to the one or more images originally sent by the user device. An optional selection of pre-determined colors may be available based on the predicted brand and style to expedite the process determining the one or more colors. If color determination is performed automatically, then a new classifier trained to identify the one or more colors of the handbag may be trained and executed. The new classifier trained to identify the one or more colors of the handbag may reference a listing of color or colors available from the predicted brand and style to increase accuracy.

An alternative to the online system (140) sending to the quotation interface (120) a single predicted brand and style, is the online system may send the quotation interface one or more predictions of a brand and style. The one or more predictions of a brand and style may be ordered based on probability calculated from the handbag classifier (145). Additionally, a plurality of stored images (144) of a predicted brand and style may be provided to the quotation interface along with the one or more predicted brand and style. An operator of the quotation interface may confirm or deny a predicted brand and style by visually comparing the predicted brand and style with corresponding plurality of stored images related to the predicted brand and style. Incorrect predictions may be saved for additional training of the handbag classifier at a later time.

Figure 5:
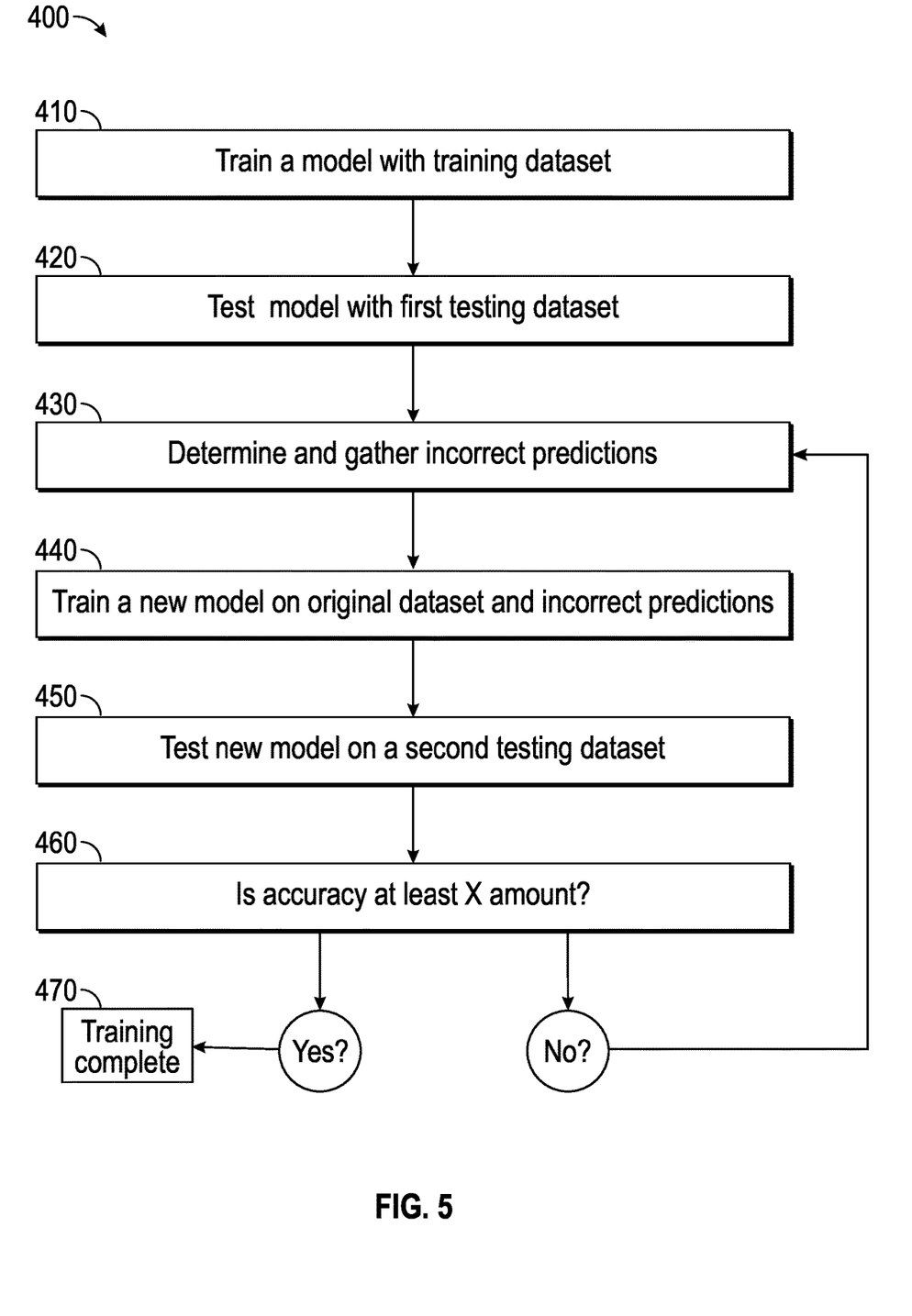
FIG. 5 is a flow chart illustrating a method for training a favorable view classifier.

The favorable view classifier (141) is one of a plurality of modules within the online system (140). Although generally the favorable view classifier is generally the first module to be executed on one or more images (111) sent from a user device (110), it can be appreciated by those with skill in the art that the favorable view classifier may be alternatively executed at a later stage. The purpose of the favorable view classifier it to determine which images from the one or more images have a frontal view and complete periphery. Views having the frontal view and complete periphery provide standard brand markings and design patterns that were intentionally designed by manufacturers into their handbags. Handbag manufacturers follow this convention so that distinctive and relevant features can be seen by others while the handbag is worn. This type of display allows the wearer of the handbag to show off the brand and style and also serves as advertisement for the handbag manufacturer. Features such as logos, shape, fabric patterns, handle straps and shoulder straps are some of the many features that are located on the front facing portion of the handbag. Additional features may even include smaller portions of the handbag such as corner radii and distinctive creases. A method of training a favorable view classifier is shown in FIG. 5.

The preprocessor stage (142) is another module as part of the online system (140). The preprocessor stage's main purpose is to alter the one or more images (111) such that the handbag classifier (145) is capable of making an accurate prediction. More particularly, some of the preprocessing steps that were performed on the plurality of stored images (144) before training the handbag classifier may also be performed on the one or more images. Alignment and grayscaling are two such examples. Alignment adjusts a handbag within the image in such a manner that a portion of the handbag is aligned to an image axis. Typically, a portion of the handbag is a base of the handbag and the image axis is a bottom axis, although other variations may be employed according to the knowledge and ability of one with skill in the art. Graycaling is a process of converting an image to grayscale by removing color from each of the one or more images and leaving only various shades of gray. Advantages of transforming the images into grayscale include reducing confusion for the handbag classifier (145) and increasing the number of images per style. Alignment and grayscaling protocols are further illustrated in FIG. 3 and FIG. 4.

The feature extractor (143) is another module as part of the online system (140). The feature extractor is a process prior to the handbag classifier (145), where a plurality of features are derived from one of the one or more images (111). This is a familiar process by those having skill in the art of convolutional neural networks (CNN). Various network architectures may be used such as Nasnet, Resnet, and VGG-19. Each of the network architectures have a different amount and order of layers comprising convolutional layers, pooling layers, and normalization layers.

Figure 2:
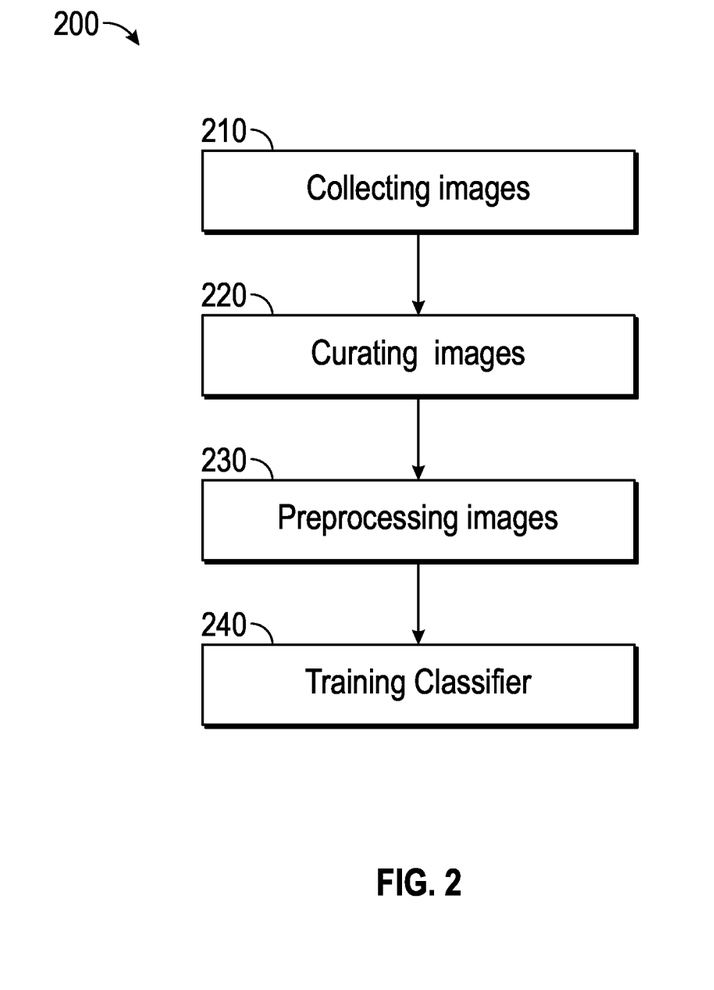
FIG. 2 is a flow chart representation of an example of a method of training a classification model for identifying handbags.

Once the one or more images (111) have been processed through the favorable view classifier (141), the preprocessing stage (142) and the feature extractor (143), the information is then fed into the handbag classifier (145) that has been trained with the plurality of stored images (144) to identify handbag characteristics. Training of the handbag classifier, including the plurality of stored images is illustrated in FIG. 2. After a prediction is made of one or more characteristics, the prediction is sent to the quotation interface (120) via the network (130). In other embodiments, there is a plurality of handbag classifiers each trained from the plurality of stored images. Each handbag classifier from the plurality of handbag classifiers generates an independent prediction resulting in a plurality of independent predictions. A final prediction is then determined, the final prediction comprising a majority from the plurality of independent predictions.

It can be appreciated by one having skill in the art that the feature extractor (143) and the handbag classifier (145) may be considered one module as the two are typically performed together with a single machine learning model.

Referring to FIG. 2, a flow chart representation of an example of a method for training a handbag classifier (200)

is shown. The steps include collecting images (210), curating images (220), preprocessing images (230) and training classifier (240).

Collecting images (210) is an important first step to acquire a training dataset needed to train a handbag classifier (145, FIG. 1). The training dataset may come from a plurality of sources. Those sources can include images used to make prior quotations, royalty free images from the internet, product marketing images created by handbag manufacturers, and images uploaded by social media users. Images may be collected by a dedicated team of people who come from a background in fashion and who are familiar with luxury handbags. A focus on rare or less commonly seen bags may need to be searched so as to acquire a sufficient number of images for a particular brand and style. Additionally, the training dataset can be supplemented by creating a collection of high-quality images taken, for example, in a studio condition. This is useful when highlighting differentiating characteristics is important, especially when those characteristics are difficult to see under normal circumstances. An example would be a handbag that has a dark color such that any texture may not be visible under normal lighting. Additional lighting may be needed so the features can adequately be shown in a photographic image.

Curating images (220) is a process of classifying characteristics of a handbag from an image. One or more persons, or curators, performing the classification of characteristics may need to be experts who are knowledgeable in luxury handbags. Certain characteristics may include brand, style, and color. To expedite a curation process, a proprietary tool may be utilized. The proprietary tool can display, along with a current image, a most similar previously classified handbag during the curation process. If the most similar previously classified handbag is also the same as the current image that a curator is classifying, then the curator does not have to manually annotate, or label, the current image.

Preprocessing images (230) is generally the next step after curating (220). In this step of training a handbag classifier (200), each of the images in the training dataset are put through a series of processes prior to training a model. Further explanation of preprocessing is discussed in FIG. 3. The steps may include, without any particular order, data inconsistency cleaning (231, FIG. 3), most suitable view curation (232, FIG. 3), color merge (233, FIG. 3), and unknown class/insufficient image classes (234, FIG. 3).

Generally, the final step of the method for training a handbag classifier (200) is the training classifier (240). The training dataset, which has already been collected, curated, and preprocessed, is then inputted into at least one machine learning model designed to classify images. CNN's are a preferable deep learning algorithm that perform well on classifying images. Multiple network architectures, such as Nasnet, Resnet, and VGG-19 may be each trained on the training dataset to find a most optimal architecture suited for the task of classifying a handbag's brand and style. Other optional steps may be configured and enabled during training. Those may include early stopping to prevent overfitting, cyclic learning rates to increase accuracy and training efficiency, and regularization to suppress less useful features. It is preferred to utilize network architectures that have been pre-trained. Pre-trained network architectures require less training time because only fine-tuning is needed with transfer learning.

Figure 3:
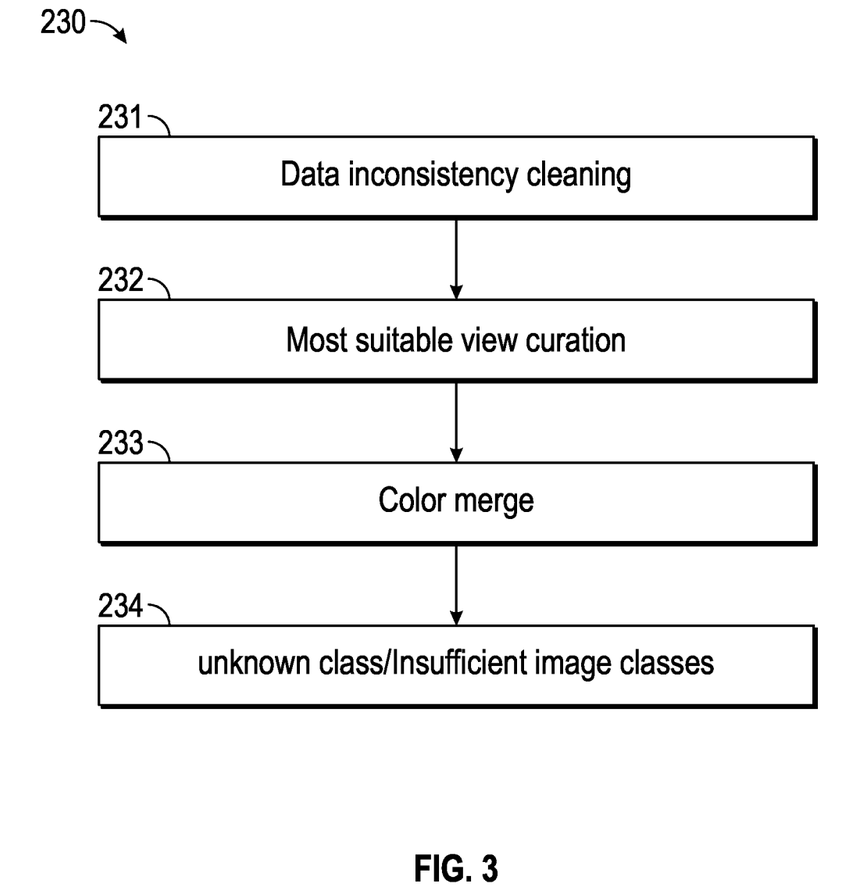
FIG. 3 is a flow chart representation of an example of a method of preprocessing data for an image classification model for identifying handbags.

Referring to FIG. 3, a flow chart representation of an example of a method for preprocessing a training dataset (230) is shown. The method comprises data inconsistency cleaning (231), most suitable view curation (232), color merge (233) and unknown class/insufficient image classes (234). It can be appreciated by one having skill in the art that the order described herein is not essential and that alternative orders can also provide similar results.

Data inconsistency cleaning (231) includes deleting duplicate images. Further elimination of images can be performed if one brand is stored in another brands folder, or if a brand is considered its own style. Further criteria for deleting images may include images with poor resolution, or images that comprise more than one handbag. If all images from a particular combination of brand and style are deleted, then that particular combination of brand and style should also be deleted.

Most suitable view curation (232) is the preprocessing step of ensuring that the model is only trained with favorable view images that are also aligned. A classifier similar to a favorable view classifier (141, FIG. 1) may be used to classify handbags that embody a frontal view with a complete periphery. The training of such a favorable view classifier is described in FIG. 5. If an image is determined not to comprise a frontal view with a complete perohpery, similar steps of image elimination described under data inconsistency cleaning (231) are performed. If the image is determined to have the frontal view with complete periphery, then the image is rotated to where the bottom portion of the handbag, or base, is parallel to the bottom edge of the image. Objectives of favorable view classification and alignment are to reduce the complexity of the classification task and increase performance.

Color merge (233) is another step in the method for preprocessing a training dataset (230). Once color from images are removed, handbags of different color but same brand and style may be combined. This allows an increase in the number of images per class (a particular combination of brand and style), while also reducing the total number of classes. In addition, treating different color variations as distinct classes tends to confuse trained models, especially those in fine-grained recognition. Therefore, by converting the images from colorscale to grayscale, there is a less of a likelihood that the trained models will be confused. One way of merging handbags of different colors together is by manually building a table of color names while the training dataset is collected and curated. Style names and colors can be used to match against the color list and merge with others found on the list. Alternatively, if training dataset is properly labeled during when curating images (220, FIG. 2), then handbags of equal brand and equal style can be combined into the same folder, regardless of color.

Certain combinations of a brand and style may not be commonly found, and thereby limiting the number of images available for training. Attempting to train a model with a class of an insufficient number of images will not only confuse the model in classifying that particular class, but also for other classes of brand and style as well. As such, unknown class/insufficient image classes (234) can be a useful step in the method for preprocessing training data (230). One approach is by having classes with a number of images less than a threshold amount eliminated from the training dataset. The threshold amount may come through experimentation or by industry standards. Classes that are eliminated may be set aside and revisited at a later time when a sufficient number of images is collected.

Figure 4:
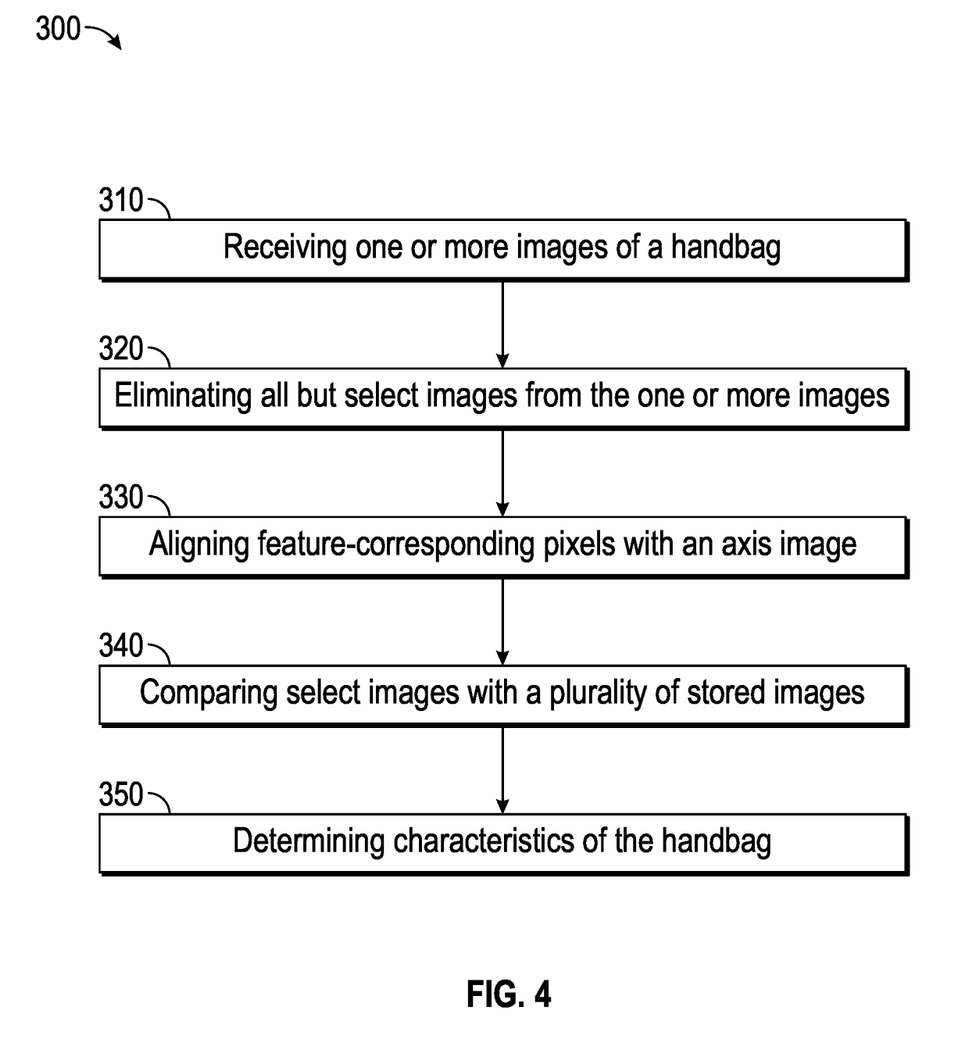
FIG. 4 is a flow chart representation of an example of a method of identifying characteristics of a handbag.

Referring to FIG. 4, a flow chart representation of an example of a method for executing a handbag classifier (300) is shown. The method of executing a handbag classifier is performed after the handbag classifier has been trained, as previously discussed in FIG. 2 and FIG. 3. The method comprises the steps: receiving one or more images of a handbag (310), eliminating all but select images from the one or more images (320), aligning feature-corresponding pixels with an axis image (330), comparing select images with a plurality of store images (340), and determining characteristic of the handbag (350).

Receiving one or more images (310) will come from a user, who may be a customer or an employee that will issue a quote for a handbag. Instructions may optionally be provided to the user prior to the images being sent regarding preferred angles of view when capturing a photo of a handbag. Specifically, the instructions given to the user would emphasize the importance of one or more images having a frontal view and complete periphery.

Eliminating all but select images from the one or more images (320) is performed by a classifier trained to determine images that have a frontal view and complete periphery of a handbag. Images embodying a frontal view and complete periphery of a handbag may be called select images. Any images that are not select images would be eliminated, or deleted, from the one or more images sent via the user. Training of a classifier that can classify favorable views is described in FIG. 5

Aligning feature-corresponding pixels with an axis image (330) is a step that may be performed before or after the one or more images have been classified as select images, preferably after to eliminate wasted processing. Preferable alignments can be accomplished by creating a parallel formation with a bottom portion of a handbag, and a bottom axis of the respective image. Alternative alignments may also be performed with other portions of the handbag and an alternative axis of an image. Alignment is especially advantageous in relation to fine-grained recognition, where similar objects which undergo a similar alignment require less or no manual annotations on particular parts of the object being identified.

Comparing select images with a plurality of stored images (340) is a step of the method of executing a handbag classifier (300). The plurality of stored images are images from a training dataset that was used to train the handbag classifier. A method of training a handbag classifier is described in FIG. 2 and FIG. 3. Optionally, the one or more images may be fed into a plurality of handbag classifiers that were each independently trained with the training dataset. Each of the handbag classifiers would make an independent prediction, resulting in a plurality of independent predictions. An actual prediction would comprise a majority from the plurality of independent predictions.

The final step of the method of executing a handbag classifier (300) is determining characteristics of the handbag (350). The characteristics may comprise a brand and a style, among other characteristics. To mitigate a risk that a handbag contained within the one or more images has not been trained by the handbag classifier, various measures can be taken to avoid making an incorrect prediction and therefore issuing an incorrect quote. One option is to set a probability minimum whereby any prediction outputted from a soft max layer, or the equivalent, would trigger the handbag classifier not to make a prediction. Instead, a message may be sent to a user notifying the user that the handbag requested is not in the system or possibly requesting more images from the user. Alternatively, a request for the user to input a particular brand and style prior to uploading the one or more images would allow the system to reference a database to determine if the handbag classifier was trained on the particular brand and style. If the particular brand and style are in the database, then a classification may commence. If the particular brand and style are not in the database, then the handbag classifier would be unable to perform the classification and identification may need to be performed manually. A manual identification can be done at a later time, or the one or more images could be immediately sent to a person having knowledge of handbags.

If multiple combinations of brand and style each have a high probability, then the handbag classifier may make multiple predictions. From the multiple predictions, a person can select an actual prediction based on their knowledge and also by referencing the one or more images originally sent by the user. These results may be saved for further training of the model.

Referring to FIG. 5, a flow chart illustrating a method for training a favorable view classifier (400) is shown. The favorable view classifier may be designed from transfer learning of a pretrained model, for example a InceptionV3 architecture. Only two outputs are desired from the favorable view classifier: a favorable view, and an unfavorable view. The favorable view can be defined by the image comprising a handbag with a frontal view and a complete periphery of the handbag. The unfavorable view is defined as an image that is not favorable. Steps to performing the method of training a favorable view classifier are as follows: training a model on a training dataset (410), testing the model with a first testing dataset (420), determining and gathering incorrect predictions (430), training a new model on the training dataset and the incorrect predictions (440) and testing the new model on a second training dataset (450). Define a desired accuracy as X. If the accuracy of the new model is greater than X, then training of the favorable view classifier is complete (570). If the accuracy is below X, then the method returns to step 3 where incorrect predictions are again determined and gathered, the incorrect predictions now being new incorrect predictions from the second training dataset. A new test model is made from the training dataset and the new incorrect predictions, and the new model is tested with a new second testing dataset. The method continues until an accuracy of at least X is reached. Performing a cycle at least 3 times may be necessary. This technique of training the favorable view classifier is known to those with skill in the art as an iterative hard negative mining technique.

Determining and gathering incorrect predictions (430) may be done automatically if images in the training and testing datasets were properly annotated, such as favorable/unfavorable, or alternatively as select/not select. If not, then incorrect predictions may require manual determination by curators.

Figure 6:
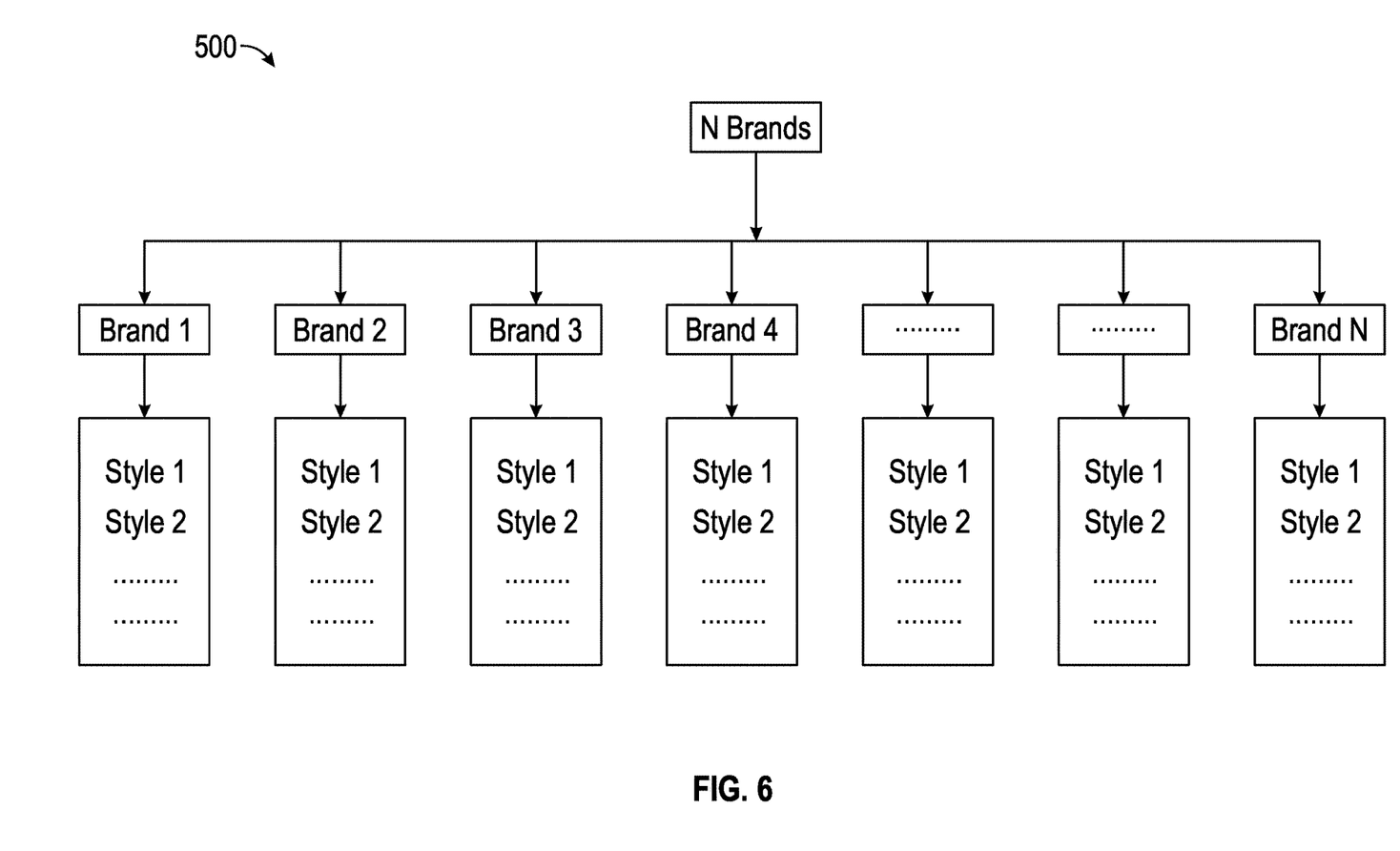
FIG. 6 is a hierarchical diagram illustrating various brands and styles.

Referring to FIG. 6, a hierarchical diagram illustrating a variety of brands and styles (500) is shown. N brands are shown, and each of the N brands comprises at least one style. However, it is common for many brands to have a plurality of styles.

Figure 7:
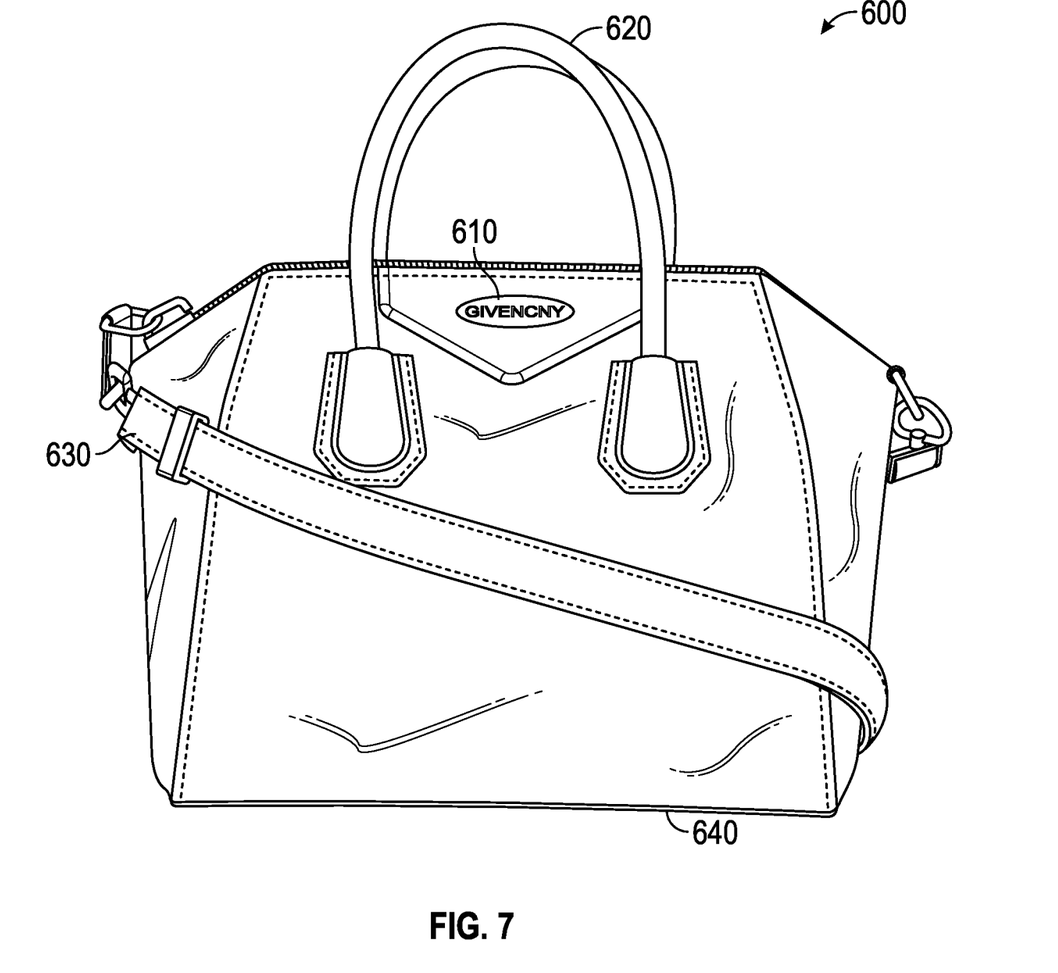
FIG. 7 is an image of a handbag with a favorable view.

Referring to FIG. 7, an image of a handbag with a favorable view (600) is shown. The image comprises a favorable view of the handbag with a frontal view and complete periphery shown. Features of the handbag such as a logo (610), hand strap (620), and shoulder strap (630) are easily seen in the image. Furthermore, a base (640) is aligned with a bottom axis of the image.

Figure 8:
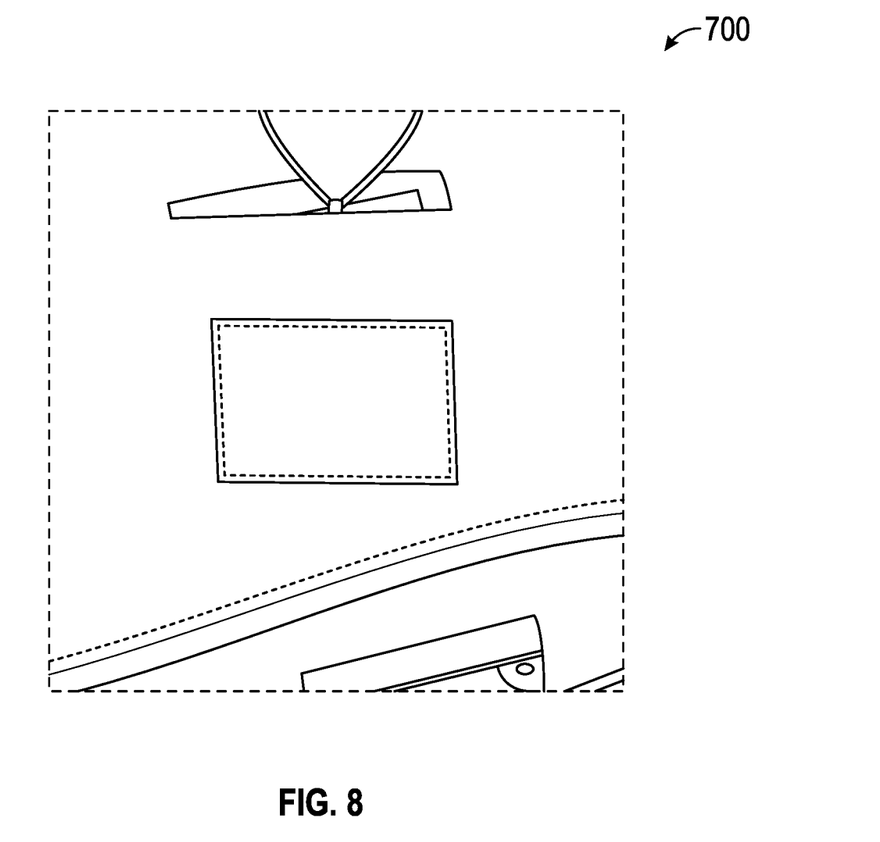
FIG. 8 is an image of a handbag without a favorable view.

Referring to FIG. 8, an image of a handbag without a favorable view (700) is shown. Although the handbag has a frontal view, the image is too close to the handbag, preventing a showing of a complete periphery. The image would not be used to train or execute a handbag classifier.

Figure 9:
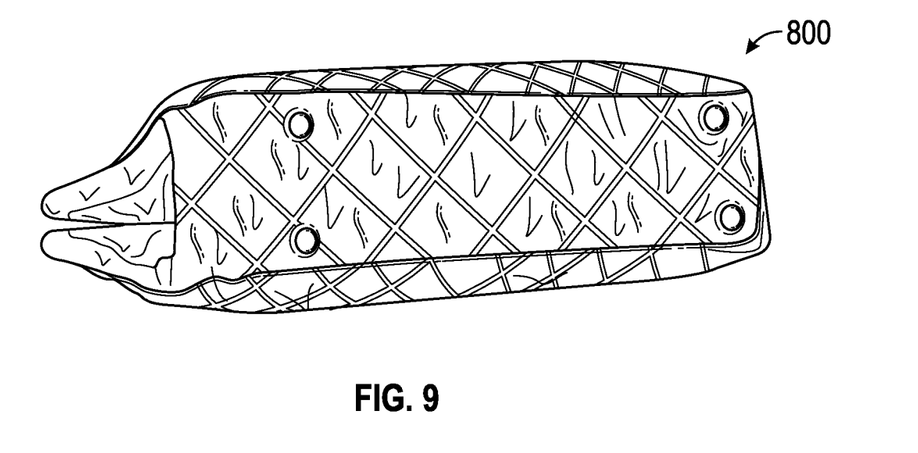
FIG. 9 is an alternative image of a handbag without a favorable view.

Referring to FIG. 9, an alternative image of a handbag without a favorable view (800) is shown. The image shows only a bottom portion of the handbag with a partial view of a side of the handbag. The image does not have a frontal view, which is important for capturing defining characteristics of the handbag. The image does not have a complete periphery. Therefore, the image would not be used to train or execute a handbag classifier.

What is claimed is:

1. A method for identifying characteristics of a handbag, the method comprising in any order:
   receiving one or more images of a handbag;
   eliminating all but select images from the one or more images of the handbag to obtain a grouping of one or more select images, the select images being those embodying a complete periphery and frontal view of the handbag;
   for each of the one or more select images, aligning feature-corresponding pixels with an image axis;
   comparing at least a portion of the one or more select images with a plurality of stored images; and
   determining said characteristics of the handbag based on said comparing;
   wherein the eliminating all but select images from the one or more images of the handbag comprises:
      executing a frontal view classifier, the frontal view classifier is trained by:
         collecting a first dataset, the first dataset comprises a plurality of images, each of the plurality of images comprises one of a plurality of handbags,
         labelling the plurality images that embody a complete periphery and frontal view as select,
         training a first model with the first dataset,
         collecting incorrect predictions from the first model, the collection of the incorrect predictions results in a second dataset, and
         training a second model with the first and second datasets, and
      identifying each of the one or more images that are select.

2. The method of claim 1, wherein the characteristics comprise a brand identifier and a style identifier.

3. The method of claim 1, the steps further comprising transforming the one or more images of the handbag or the one or more select images from a colorscale to a grayscale image.

4. The method of claim 1, wherein said comparing the at least a portion of the one or more select images with a plurality of stored images comprises:
   for each of the one or more select images, extracting a plurality of style-identifying features from the handbag contained therein; and
   comparing the plurality of style-identifying features with a plurality of stored-image features from each of the plurality of stored images.

5. A computer system comprising:
   a processor; and
   a non-transitory computer-readable medium configured to store instructions, the instructions when executed by the processor cause the processor to perform steps comprising:
      receiving one or more images of a handbag;
      eliminating all but select images from the one or more images of the handbag to obtain a grouping of one or more select images, the select images being those embodying a complete periphery and frontal view of the handbag;
      for each of the one or more select images, aligning feature-corresponding pixels with an image axis;
      comparing at least a portion of the one or more select images with a plurality of stored images; and
      determining characteristics of the handbag based on said comparing;
      wherein the eliminating all but select images from the one or more images of the handbag comprises:
         executing a frontal view classifier, the frontal view classifier is trained by:
            collecting a first dataset, the first dataset comprises a plurality of images, each of the plurality of images comprises one of a plurality of handbags,
            labelling the plurality images that embody a complete periphery and frontal view as select,
            training a first model with the first dataset,
            collecting incorrect predictions from the first model, the collection of the incorrect predictions results in a second dataset, and
            training a second model with the first and second datasets, and
         identifying each of the one or more images that are select.

6. The computer system of claim 5, wherein the characteristics comprise a brand identifier and a style identifier.

7. The computer system of claim 5, the steps further comprising transforming the one or more images of the handbag or the one or more select images from a colorscale to a grayscale image.

8. The computer system of claim 5, wherein said comparing at least a portion of the one or more select images with the plurality of stored images comprises:
   for each of the one or more select images, extracting a plurality of style-identifying features from the handbag contained therein; and
   comparing the plurality of style-identifying features with a plurality of stored-image features from each of the plurality of stored images.

9. A non-transitory computer-readable medium configured to store instructions, the instructions when executed by one or more computers, cause the one or more computers to perform operations comprising:
   receiving one or more images of a handbag;
   eliminating all but select images from the one or more images of the handbag to obtain a grouping of one or more select images, the select images being those embodying a complete periphery and frontal view of the handbag;
   for each of the one or more select images, aligning feature-corresponding pixels with an image axis;
   comparing at least a portion of the one or more select images with a plurality of stored images; and
   determining characteristics of the handbag based on said comparing;
   wherein the eliminating all but select images from the one or more images of the handbag comprises:
      executing a frontal view classifier, the frontal view classifier is trained by:
         collecting a first dataset, the first dataset comprises a plurality of images, each of the plurality of images comprises one of a plurality of handbags,
         labelling the plurality images that embody a complete periphery and frontal view as select,
         training a first model with the first dataset, collecting incorrect predictions from the first model, the collection of the incorrect predictions results in a second dataset, and training a second model with the first and second datasets, and identifying each of the one or more images that are select.

10. The non-transitory computer-readable medium of claim 9, wherein the characteristics comprise a brand identifier and a style identifier.

11. The non-transitory computer-readable medium of claim 9, the steps further comprising transforming the one or more images of the handbag or the one or more select images from a colorscale to a grayscale image.

12. The non-transitory computer-readable medium of claim 9, wherein said comparing the at least a portion of the one or more select images with a plurality of stored images comprises:

for each of the one or more select images, extracting a plurality of style-identifying features from the handbag contained therein; and comparing the plurality of style-identifying features with a plurality of stored-image features from each of the plurality of stored images.

\* \* \* \* \*